United States Patent
Ootori et al.

(10) Patent No.: US 7,509,816 B2
(45) Date of Patent: Mar. 31, 2009

(54) AIR CONDITIONER

(75) Inventors: Masahiko Ootori, Shizuoka-ken (JP); Kazuhito Oono, Shizuoka-ken (JP)

(73) Assignee: Toshiba Carrier Corporation, Tokyo (JP)

( * ) Notice: Subject to any disclaimer, the term of this patent is extended or adjusted under 35 U.S.C. 154(b) by 71 days.

(21) Appl. No.: 11/641,819

(22) Filed: Dec. 20, 2006

(65) Prior Publication Data

US 2007/0095081 A1    May 3, 2007

Related U.S. Application Data

(62) Division of application No. 10/757,513, filed on Jan. 15, 2004, now abandoned.

(51) Int. Cl.
*F25B 49/00* (2006.01)
*F25D 17/04* (2006.01)

(52) U.S. Cl. .................... 62/176.3; 62/228.1
(58) Field of Classification Search ........... 62/228.1, 62/228.3, 176.3
See application file for complete search history.

(56) References Cited

U.S. PATENT DOCUMENTS 6,530,426 B1 * 3/2003 Kishita et al. ............... 165/202

FOREIGN PATENT DOCUMENTS

| JP | 61070333 A | * | 4/1986 |
| JP | 63058051 | | 3/1988 |
| JP | 01033457 A | * | 2/1989 |
| JP | 07-103558 | | 4/1995 |
| JP | 11-132538 A | | 5/1999 |
| JP | 3346616 B | | 9/2002 |
| JP | 2003166743 A | * | 6/2003 |

* cited by examiner

*Primary Examiner*—Chen-Wen Jiang
(74) *Attorney, Agent, or Firm*—Pillsbury Winthro Shaw Pittman LLP

(57) ABSTRACT

In an air conditioner provided with a capacity variable compressor unit including an inverter, the capacity of the capacity variable compressor unit is controlled in response to air-conditioning load data including temperature difference between a set temperature and an indoor temperature. An inverter frequency for controlling an operation condition of the compressor unit is controlled by limiting a frequency obtained in response to the air-conditioning load data to a value less than a maximally allowable capacity stored in memory means such as ROM or EEPROM.

4 Claims, 6 Drawing Sheets

TABLE 1

| | To (°C) | | |
|---|---|---|---|
| | ~18 | 18~24 | 25~ |
| MF (Hz) (COOLING) | 40 | 60 | 90 |
| MF (Hz) (HEATING) | 90 | 60 | 40 |

TABLE 2

| Ha (%) \ To(°C) | ~18 | 18~24 | 25~ |
|---|---|---|---|
| ~30 | 30 | 50 | 70 |
| 30~60 | 40 | 55 | 80 |
| 60~ | 40 | 60 | 90 |

MF (Hz)

AIR CONDITIONER

This application is a divisional of co-pending U.S. application Ser. No. 10/757,513, filed Jan. 15, 2004, to which priority is claimed under 35 U.S.C. §121 the entire contents of which are incorporated herein by reference.

BACKGROUND OF THE INVENTION

1. Field of the Invention

The present invention relates to an air conditioner capable of realizing a suitable operation of the air conditioner responding to conditions of the air conditioner setting site or area at an improved energy consumption efficiency.

2. Relevant Art

Generally, a known air conditioner is provided with a cooling cycle, which includes a capacity (power) variable compressor, an outdoor heat exchanger, a pressure reduction device and an indoor heat exchanger, through Which a refrigerant as cooling medium, for example, flows.

In such air conditioner, the operation of these equipments, that is, the flow of the cooling medium, is controlled by a control unit which controls operation (driving) frequency of the capacity variable compressor unit including an inverter. In other wards, an output frequency of the inverter is controlled in accordance with an operation load concerned to temperature data including a temperature difference (i.e., operation load) between an indoor temperature and a set temperature.

For example, one example of such known air conditioner is disposed in Japanese Patent Laid-open (KOKAI) Publication No. SHO 63-58051, in which the maximally allowable operation frequency of the capacity variable compressor, which is variably driven by an inverter, is controlled and set in response to an outdoor temperature detected by an outdoor temperature detector.

According to such air conditioner, the maximally allowable operation frequency, i.e., revolution number, of the compressor corresponding to the air conditioning load can be set based on the outdoor temperature, and hence, it becomes possible to reduce a dead high capacity operation period at a small load condition, thus realizing an improved energy efficiency.

In general, although the load of the air conditioner mainly depends on the outdoor temperature, it may further depend on various other factors or conditions of, for example, place or area for the setting of the air conditioner and the size or scale of a room to which the air conditioner is set, and an indoor humidity or like.

For example, in a case where an air conditioner is set to a wide room, an air conditioning load to be required is of course made large, and on the other hand, in a case where the air conditioner is set to a narrow room, the air conditioning load to be required will become small. Furthermore, in the period when the air conditioner is operated as a cooler, cooling capacity is distributed to sensible heat component reducing the room temperature and latent heat component reducing the indoor (room) humidity. Accordingly, in a condition that the indoor humidity is high, a large cooling capacity (power) is required and, on the contrary, in a condition that the indoor humidity is low, it is sufficient to carry out the air conditioning only at a small cooling capacity (power). In this viewpoint, as in the described known technology, the maximally allowable operating frequency, i.e., revolution number, was set and stored uniformly, as a stationary value, in memory means such as ROM in accordance with the outdoor temperature. According to this known type air conditioner, it was therefore difficult or impossible to treat or control influence of air conditioning load based on a factor other than the outdoor temperature.

Furthermore, Japanese Patent No. 3346616 discloses an air conditioner includes an outdoor unit provided with a memory such as EEPROM (electrically erasable programmable read-only memory) storing control data responding to different, i.e., four, kinds of machines and includes a control circuit selecting the control data based on the machine kind date from an indoor unit to thereby commonly use the outdoor unit responding to different kinds of the machines.

On the other hand, as briefly mentioned above, in the known air conditioner, the indoor humidity is controlled by applying dehumidification function to the air conditioner. However, Known air conditioners are provided with no control unit in which an actually detected indoor humidity is considered for the determination of the operation of the inverter of the capacity variable compressor unit.

SUMMARY OF THE INVENTION

An object of the present invention is to substantially eliminate defects or drawbacks encountered in the prior art mentioned above and to provide an air conditioner at a suitable operating condition by limiting the maximum capacity to a value less than the maximally allowable capacity stored in memory means, for example, ROM or EEPROM to thereby improve energy saving performance and air conditioning comfortability.

Another object of the present invention is to provide an air conditioner capable of controlling the maximum capacity responding to air conditioning load determined by factors including actual indoor humidity as well as outdoor temperature.

A further object of the present invention is to provide an air conditioner capable of being suitably operated at a time of so-called "thermo-off" (operation-stop) at limited maximum capacity for operation to effectively save consumption energy.

These and other objects can be achieved according to the present invention by providing, in one aspect, an air conditioner comprising:

a capacity variable compressor unit;
an outdoor side heat exchanger;
a pressure reduction valve;
an indoor side heat exchanger, the a capacity variable compressor unit, the outdoor side heat exchanger, the pressure reduction valve and the indoor side heat exchanger constituting a cooling medium circulation line;
a control unit operatively connected to the capacity variable compressor unit;
a temperature setting device electrically connected to the control unit for setting a predetermined temperature;
an outdoor temperature sensor electrically connected to the control unit and adapted to detect an outdoor temperature;
an indoor temperature sensor electrically connected to the control unit and adapted to detect an indoor temperature; and
a humidity sensor electrically connected to the control unit and adapted to detect a humidity of the indoor side,
the control unit including capacity determining means for determining a capacity of the capacity variable compressor unit in accordance with a temperature data from the indoor temperature sensor and the temperature setting device, memory address means into which information of the outdoor temperature and the indoor humidity is inputted, memory means in which a maximally allowable capacity to be read out in relation to the indoor humidity is stored, and maximum capacity limiting means for limiting the capacity of the capacity variable compressor unit determined in accordance with the temperature data to a value less than the maximally allowable capacity read out from the memory means.

The maximally allowable capacity may be read out further in relation to the outdoor temperature in addition to the indoor humidity.

In the above aspect, the memory means is programmable or rewritable memory means comprising an electrically erasable programmable read-only memory (EEPROM) in which a value of maximally allowable capacity for the capacity variable compressor unit is made programmable.

The temperature data includes temperature difference between the detected indoor temperature and the set temperature and includes temperature variation.

The capacity variable compressor unit includes an inverter operatively connected to the control unit and a compressor driven at a revolution number determined in response to an operation condition of the inverter, the capacity determining means of the control unit generates a signal representing a target frequency for the inverter on the basis of the temperature data, and the maximum capacity limiting means generates a signal representing an inverter operation frequency determined in comparison with the target frequency and the maximally allowable frequency read out from the memory means.

In another aspect of the present invention, there is also provided an air conditioner comprising:

a capacity variable compressor unit;

an outdoor side heat exchanger;

a pressure reduction valve;

an indoor side heat exchanger, the a capacity variable compressor unit, the outdoor side heat exchanger, the pressure reduction valve and the indoor side heat exchanger constituting a cooling medium circulation line;

a control unit operatively connected to the capacity variable compressor unit;

a temperature setting device electrically connected to the control unit for setting a predetermined temperature;

an indoor temperature sensor electrically connected to the control unit and adapted to detect an indoor temperature, which is transmitted to the control unit; and the control unit including capacity determining means for determining a capacity of the capacity variable compressor unit in accordance with a temperature data from the indoor temperature sensor and the temperature setting device, memory address means, memory means in which a maximally allowable capacity to be addressed by the memory address means is stored, and maximum capacity limiting means for limiting the capacity of the capacity variable compressor unit determined in accordance with the temperature data to a value less than the maximally allowable capacity read out from the memory means, after instructions for stopping operation of the capacity variable compressor unit have been once generated in accordance with the temperature data from the capacity determining means.

In this aspect, the memory means for setting and storing a maximally allowable capacity may comprise a programmable memory means of EEPROM.

In this aspect, the capacity variable compressor unit also includes an inverter operatively connected to the control unit and a compressor driven at a revolution number determined in response to an operation condition of the inverter, the capacity determining means of the control unit generates a signal representing a target frequency for the inverter operated in accordance with the temperature data from the capacity determining means, and the maximum capacity limiting means generates a signal representing an inverter operation frequency determined in comparison with the target frequency from the capacity determining means and the maximally allowable frequency read out from the memory means.

In a further aspect of the present invention, there is also provided an air conditioner a capacity variable compressor unit;

an outdoor side heat exchanger;

a pressure reduction valve;

an indoor side heat exchanger, the a capacity variable compressor unit, the outdoor side heat exchanger, the pressure reduction valve and the indoor side heat exchanger constituting a cooling medium circulation line;

a control unit operatively connected to the capacity variable compressor unit;

a temperature setting device electrically connected to the control unit for setting a predetermined temperature;

an outdoor temperature sensor electrically connected to the control unit and adapted to detect an outdoor temperature, which is transmitted to the control unit; and an indoor temperature sensor electrically connected to the control unit and adapted to detect an indoor temperature, which is transmitted to the control unit, the control unit including capacity determining means for determining a capacity of the capacity variable compressor unit in accordance with temperature data based on the set temperature and the indoor temperature, memory address means into which the outdoor temperature is inputted, programmable memory means storing a maximally allowable capacity for the capacity variable compressor unit which is read out in response to the outdoor temperature, and maximum capacity limiting means for limiting the capacity of the capacity variable compressor unit determined in accordance with the temperature data to a value less than the maximally allowable capacity read out from the programmable memory means such as an electrical erasable program read-only-memory (EEPROM).

In this further aspect, the capacity variable compressor unit includes an inverter operatively connected to the control unit and a compressor driven at a revolution number determined in response to an operation condition of the inverter, the capacity determining means of the control unit generates a signal representing a target frequency for the inverter operated in accordance with the temperature data from the capacity determining means, and the maximum capacity limiting means generates a signal representing an inverter operation frequency determined in comparison with the target frequency from the capacity determining means and the maximally allowable frequency read out from the programmable memory means.

According to the present invention of the structures and characters mentioned above, the target inverter frequency for controlling an operation condition of the inverter (compressor unit) can be suitably controlled by limiting the frequency obtained in response to the air-conditioning load data such as temperature data and/or humidity data to a value less than a maximally allowable capacity (maximally allowable frequency) stored in memory means such as ROM or EEPROM.

Furthermore, according to the air conditioner of the present invention, the inverter frequency can be set to a value suitable for the location, area, size or space at which the air conditioner is set with saved energy consumption.

The nature and further characteristic features of the present invention will be made more clear from the following descriptions made with reference to the accompanying drawings.

DESCRIPTION OF THE PREFERRED EMBODIMENTS

Preferred embodiments of the present invention will be described hereunder with reference to the accompanying drawings.

Figure 1:
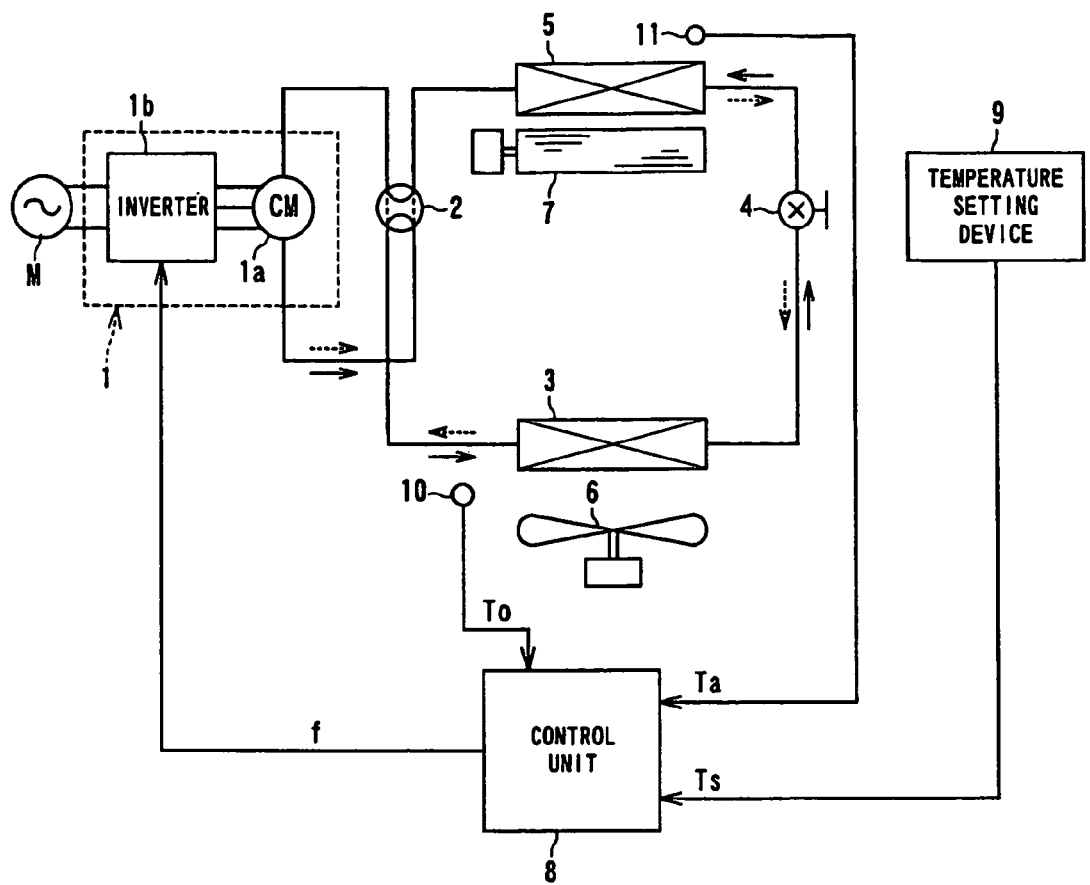
FIG. 1 is a schematic diagram showing an air conditioner according to a first embodiment of the present invention.

First, with reference to FIG. 1, a first embodiment of the present invention is described.

An air conditioner of FIG. 1 has a structure of heat-pump type cooling cycle which is composed of a capacity variable compressor unit 1, a four-way valve 2, an outdoor side heat exchanger 3, a pressure reduction valve, i.e., expansion valve, 4 and an indoor side heat exchanger 5.

At a cooling operation of the air conditioner, when the capacity variable compressor unit 1 is driven to start the operation of the air conditioner, a refrigerant as cooling medium flows through the above-mentioned cycle along a direction of solid arrows, and during such cooling operation, the outdoor side heat exchanger 3 acts as a condenser and the indoor side heat exchanger 5 acts as an evaporator.

On the other hand, at a heating operation of the air conditioner, the four-way valve 2 is switched and the cooling medium flows along a direction of chain arrows, opposing to the above-mentioned solid arrow direction, and during such heating operation, the outdoor side heat exchanger 3 acts as an evaporator and the indoor side heat exchanger 5 acts as a condenser.

An outdoor side fan 6 is arranged near the outdoor side heat exchanger 3, thus constituting an outdoor unit of the air conditioner, and on the other hand, an indoor side fan 7 is also arranged near the indoor side heat exchanger 5, thus constituting an indoor unit of the air conditioner.

Further, the capacity variable compressor unit 1 includes an compressor (compressor motor) 1a which is driven at a frequency (Hz) from an inverter 1b.

In FIG. 1, reference numeral 8 denotes a control unit composed of, for example, a micro-computer, and to the control unit 8, there are electrically connected a temperature setting device 9, an outdoor temperature sensor 10 and an indoor temperature sensor 11. That is, electrical signals therefrom are inputted into the control unit 8. The control unit 8 is also operatively connected to the inverter 1b of the capacity variable compressor unit 1.

In the above constitutional equipments or devices, the temperature setting device 9 outputs, at a time of operation, a signal representing an information of the set temperature Ts, the indoor temperature sensor 11 detects an indoor temperature Ta and outputs a signal representing its information to the control unit 8, and the outdoor temperature sensor 10 detects an outdoor temperature To and outputs a signal representing its information to the control unit 8.

On the other hand, the inverter 1b acts to convert an AC source voltage to an AC voltage having a predetermined frequency in response to a signal representing inverter frequency information from the control unit 8, which will be described in detail hereunder, and the converted AC voltage is supplied to the compressor (compressor motor) 1a.

The control unit 8 is provided with a control means 13, such as micro-computer, into which the information from the above respective equipments or devices 9, 10 and 11 are inputted by means of signals, and which performs operation or comparison to determine a target (aimed) operating frequency F and then to determine the inverter frequency f in consideration of a maximally allowable capacity. That is, the control unit 8 is also provided with a memory means 14, as programmable memory means, especially, EEPROM (Electrically Erasable Programmable Read-Only Memory), which will be also explained hereinlater.

Figure 2:
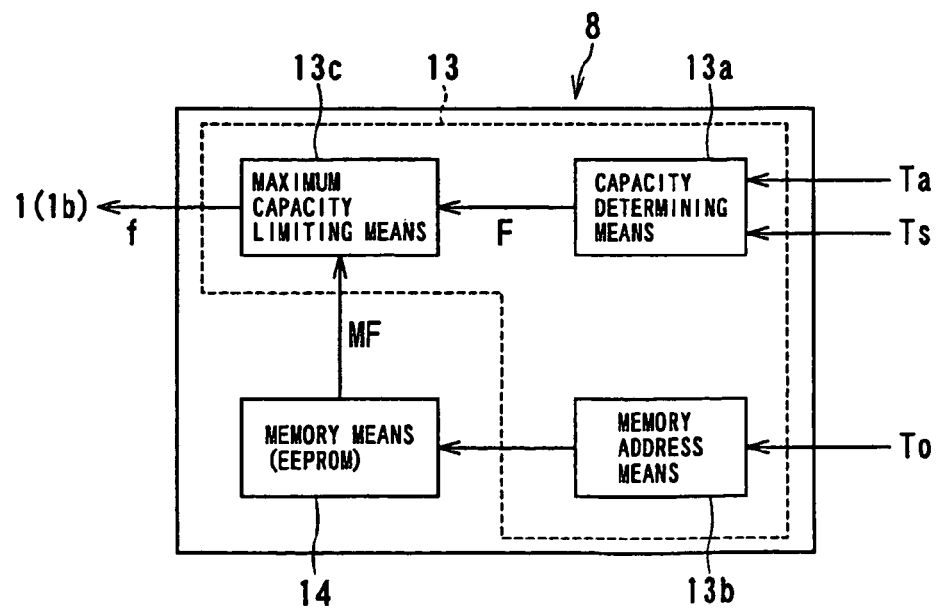
FIG. 2 is a block diagram of a control unit of the air conditioner of FIG. 1.

With reference to FIG. 2, the control means 13 includes a capacity determining means 13a, a memory address means 13b and a maximum capacity limiting means 13c. That is, the target frequency F for the inverter is determined in the capacity determining means 13a on the basis of temperature data including temperature difference T between the room (indoor) temperature Ta detected by the indoor temperature sensor 11 and the setting temperature Ts from the temperature setting device 9 (T=Ta−Ts) in addition to temperature variation in time. The result of the comparison in the capacity in the ability determining means 13a is sent to the maximum capacity limiting means 13c as target frequency F.

Figures 3, 4:
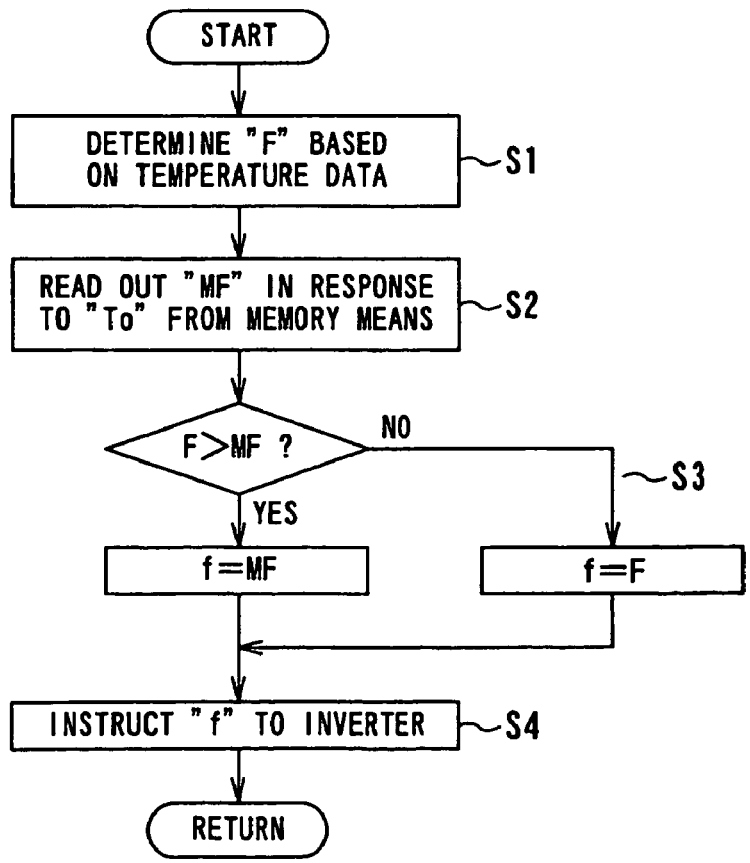
FIG. 3 shows a Table 1 of memory means including data of outdoor temperature and maximally allowable frequency.
FIG. 4 is a flowchart representing the operation in the control unit for determining an inverter frequency according to the first embodiment.

The information of the outdoor temperature To detected by the outdoor temperature sensor 10 is inputted into the memory address means 13b addressing to the memory means 14 for reading out data in Table 1 of FIG. 3. In the memory means 14, the data of the outdoor temperature (temperature range) and the maximally allowable frequency MF (Hz) are stored as shown in the Table 1.

Then, the maximally allowable frequency MF read out in response to the load condition of the outdoor temperature To is sent to the maximum capacity limiting means 13c in which the maximally allowable frequency MF from the memory means 14 is compared with the target frequency F. In response to the result of comparison between these frequencies F and MF, an inverter output the inverter frequency f of a value which is limited to be less than the maximally allowable capacity read out from the memory means (EEPROM) 14, is outputted to the inverter 1b of the capacity variable compressor unit 1.

In the air conditioner of the structure according to the present invention mentioned above, since the maximally allowable frequency MF is stored in the programmable memory means, such as EEPROM, the frequency MF can be changed, i.e., rewritten at the time of shipment of product from factory in accordance with an area or place at which the air conditioner is set.

The operation and/or function of the air conditioner of the characters mentioned above will be described hereunder.

First, it is to be noted that the cooling cycle of the operation of the air conditioner according to the present invention will be mentioned hereunder.

The cooling cycle is set through the operation of an operation panel or like. At this time, a desired indoor temperature Ts is set by the temperature setting device 9, and then, the cooling cycle operation starts.

Then, the control unit 8 instructs to drive the inverter 1b of the capacity variable compressor unit 1 to thereby drive the compressor (i.e., compressor motor) 1a. Then, the four-way valve 2 is driven to select the cooling cycle operation and also the outdoor fan 7 and the indoor fan 8 are driven, respectively.

Upon starting the operation of the compressor 1a, through the switching of the four-way valve 2, the cooling operation starts.

During the cooling operation, the set temperature Ts from the temperature setting device 9 and the indoor temperature Ta detected by the indoor temperature sensor 11 are inputted in the control means 13, i.e., the capacity determining means 13a, in which the difference T in the temperature (T=Ta−Ts) is calculated and, then, according to the calculation result, a signal representing the target frequency F is generated to the maximum capacity limiting means 13c. The determination of this target frequency will be performed by a known method or means such as proportional-plus-integral control or fuzzy control method.

On the other hand, in the programmable memory means 14, the relationship between the outdoor temperature To and the maximally allowable frequency MF is stored such as shown in Table 1 of FIG. 3, as one example. Referring to the Table 1, the maximally allowable frequency MF (Hz) at the outdoor temperature To of less than 18° C. is stored as 40 Hz, in the case of the To of 18 to 24° C., the MF is of 60 Hz and in the case of the To of more than 25° C., the MF is of 90 Hz (no limit), for example. The values of the MF in the Table 1 may be blank in the memory means of EEPROM 14 in the manufacturing stage and will be written (programmed) in the shipment stage.

That is, when the outdoor temperature of 20° C. is for example detected, the maximally allowable frequency 60 Hz is read out by the addressing of the memory address means 13b and send to the maximum capacity limiting means 13c, as maximally allowable frequency MF, in which the comparison between the maximally allowable frequency MF and the target frequency F is made, and according to this comparison, the inverter frequency f is determined to a value limited to be less than the maximally allowable capacity, which is then sent to the inverter 1b of the capacity variable compressor unit 1.

As mentioned above, according to the embodiment of the present invention, the control unit includes the memory means in which the maximally allowable frequency (capacity) is not stored as stationary value and is stored to be programmable at the shipment stage or like to values to be controlled to be less than the maximally allowable capacity responding to the area or place at which the air conditioner is set.

The above operation of the described embodiment will be made further clear from the description made with reference to the flowchart of FIG. 4.

When the cooling operation of the air conditioner starts, in step S1, the setting temperature Ts and the indoor temperature Ta are detected respectively by the temperature setting device 9 and the indoor temperature sensor 11. The signals representing these detected temperature values Ts and Ta are compared to obtain a temperature difference (Ta−Ts). According to this difference, a target frequency F for an inverter output frequency is calculated and sent to the maximum capacity limiting means 13c.

In the next step S2, the maximally allowable frequency MF in the memory means, i.e., EEPROM, 14, addressed by the memory address means 13b, responding to the detected outdoor temperature To is read out and sent to the maximum capacity limiting means 13c.

In step S3, the read-out maximally allowable frequency MF is inputted into the maximum capacity limiting means 13c, in which the maximally allowable frequency MF is compared with the target frequency F so as to judge whether the latter F is larger than the former MF (F>MF). In the case of "Yes", the maximally allowable frequency MF is judged and processed as the inverter frequency f=MF. On the contrary, in the case of "No", the frequency F is judged and limited as the frequency f=F.

The thus determined (limited) inverter output frequency f is, in the next step S4, sent to the inverter 1b of the capacity variable compressor 1. According to this inverter frequency f, the cooling operation cycle of the air conditioner is performed.

In the embodiment described above, although the operation of the air conditioner of the present invention was described through its cooling cycle operation, this embodiment may be applicable to heating cycle operation thereof. In the heating cycle, the cooling medium circulates through the line shown with chain (dotted) line in FIG. 1 and in such case, the capacity variable compressor unit will be operated at the inverter frequency f which is limited by the maximally allowable frequency MF(heat) in the Table 1 of FIG. 3, for example, stored in the memory means 14 of EEPROM.

In a second embodiment of the present invention, an indoor humidity is considered as a parameter or function of air conditioning load. That is, with reference to FIG. 5, an indoor humidity sensor 12 is further arranged in addition to the arrangement of the air conditioner of FIG. 1. That is, the in indoor humidity Ha is further considered for the determination of the inverter frequency f.

With this embodiment, the cooling cycle or arrangement of the air conditioner is substantially the same as that of the first embodiment of FIG. 1 except location of the indoor humidity sensor 12.

That is, the indoor humidity Ha detected by the indoor humidity sensor 12 is inputted into the control unit 8, i.e., memory address means 13b of the control means 13 of the control unit 8 together with the outdoor temperature To.

Figure 6:
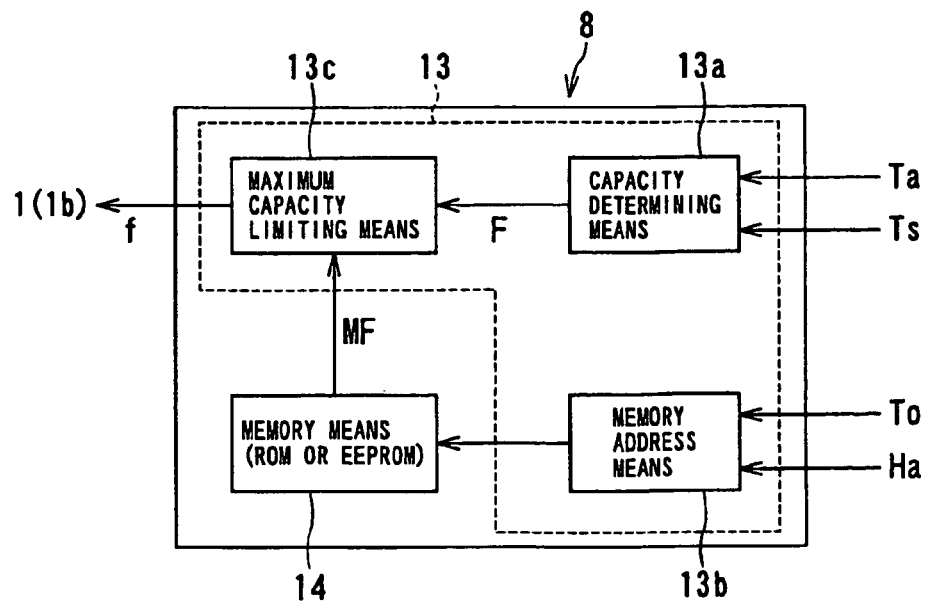
FIG. 6 is a block diagram of a control unit of the air conditioner of FIG. 5.

Further, in this embodiment, a ROM table such as Table 2 of FIG. 6 is preliminarily stored in the memory means 14 such as ROM, and according to such Table 2, the maximally allowable frequency MF is read out in accordance with the detected outdoor temperature To and the detected indoor humidity Ha. For example, in a case where the detected outdoor temperature To is 20° C. and the detected indoor humidity Ha is 50%, the maximally allowable frequency MF is 55 Hz and in a case where the detected outdoor temperature To is 30° C. and the detected indoor humidity Ha is 20%, the maximally allowable frequency MF is 70 Hz.

Figures 7, 8:
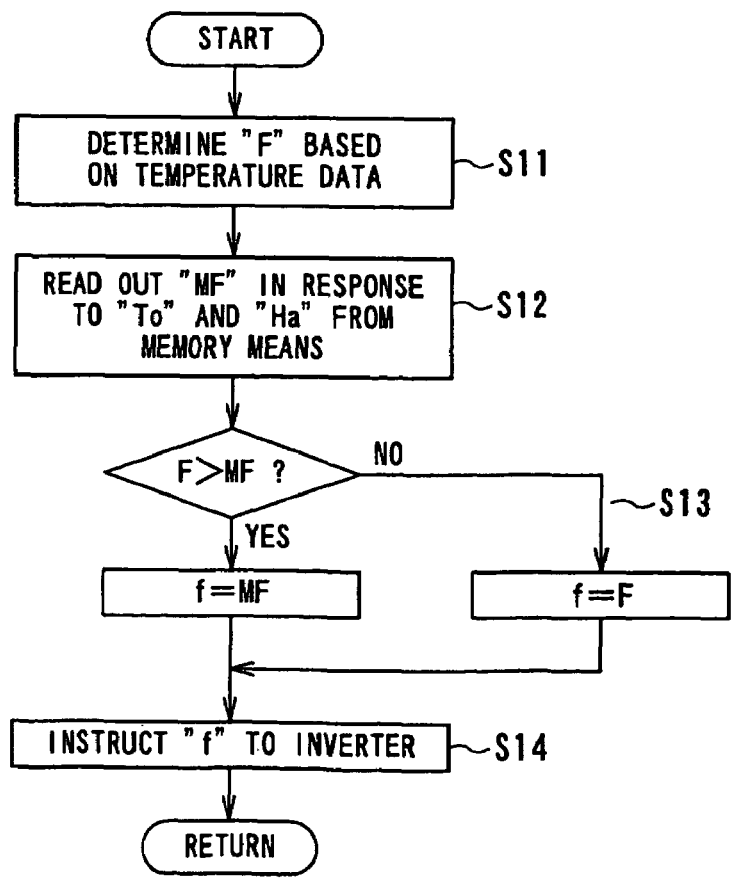
FIG. 7 shows a Table 2 of memory means including data of outdoor temperature, indoor humidity and maximally allowable frequency.
FIG. 8 is a flowchart representing the operation in the control unit for determining an inverter frequency according to the second embodiment.

This embodiment will be described more clearly described hereunder with reference to FIG. 6 and the flowchart of FIG. 7.

When the cooling operation of the air conditioner starts, in step S11, the setting temperature Ts and the indoor temperature Ta are detected respectively by the temperature setting device 9 and the indoor temperature sensor 11. The signals representing these detected temperature values are inputted into the capacity determining means 13a of the control means 13 of the control unit 8, in which the temperatures Ts and Ta are compared to obtain a difference (T=Ta−Ts). A target frequency F obtained according to such temperature data is sent to the maximum capacity limiting means 13c.

In the next step S12, the memory address means 13b reads out the maximally allowable frequency MF stored in the memory means (ROM) 14 responding to the outdoor temperature To and the indoor humidity Ha of values, for example, as shown in Table 2.

In step S13, the read out maximally allowable frequency MF is inputted into the maximum capacity limiting means 13c, in which the maximally allowable frequency MF from the ROM 14 is compared with the target frequency F to judge whether the latter F is larger than the former MF (F>MF). In the case of "Yes", the maximally allowable frequency MF is judged and processed as the inverter frequency f (f=MF). On the contrary, in the case of "No", the frequency F is judged and processed as the frequency f=F.

The thus determined inverter output frequency f is, in the next step S14, sent to the inverter 1b of the capacity variable compressor 1. According to the above steps, the cooling cycle of the air conditioner is performed at the suitable operating functions.

According to this embodiment, as mentioned above, the inverter frequency f is determined further in consideration of the detected indoor humidity as well as outdoor temperature by limiting the capacity of the capacity variable compressor unit to a value less than the maximally allowable frequency stored in the ROM.

In a modified embodiment of the above aspect, the ROM as memory means 14 may be substituted as programmable memory means such as EEPROM. In such modification, the inverter frequency f for the capacity of the capacity variable compressor unit 1 will be determined to a value in consideration of the maximally allowable frequency MF stored in the EEPROM 14 as in the first embodiment. In this case, the EEPROM 14 is made blank at the manufacturing stage and is written at the time of shipment in accordance with place or area to which the air conditioner is set.

Further, it is to be noted that in a further modified embodiment, it may be possible to determine the inverter frequency f only in accordance with the detected indoor humidity.

Furthermore, it is also to be noted that it is of course no problem that the air conditioner of the first embodiment mentioned above is equipped with such humidity sensor.

Figure 9:
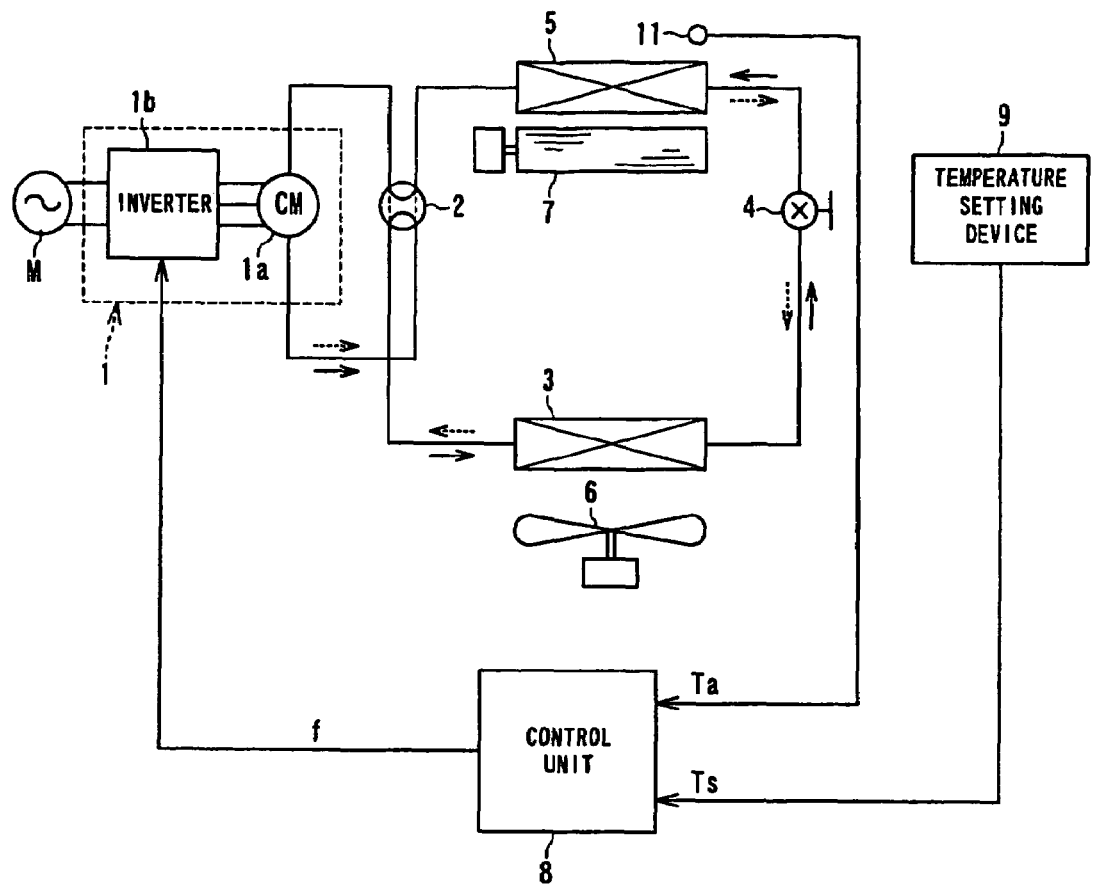
FIG. 9 is a schematic diagram showing an air conditioner according to a third embodiment of the present invention.
Figure 10:
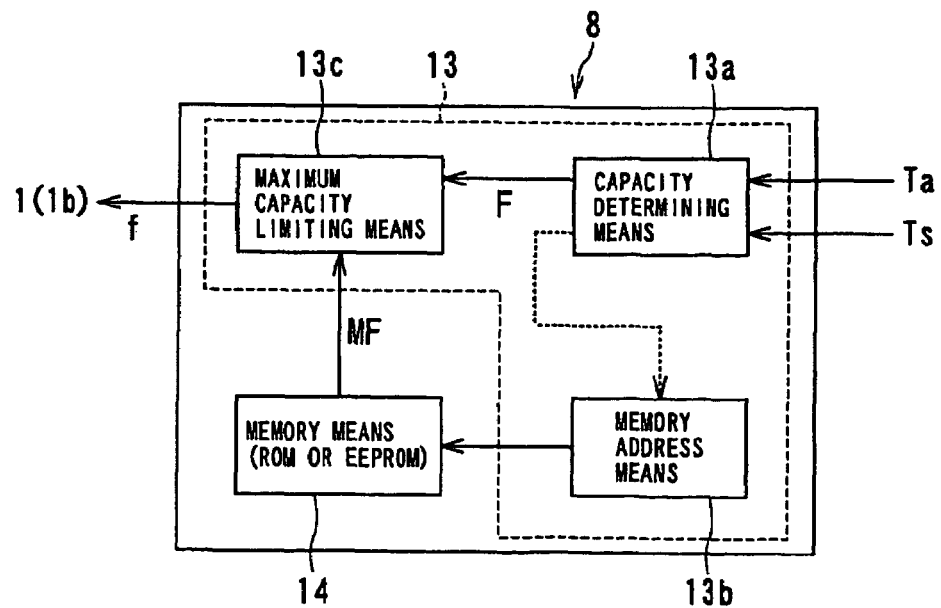
FIG. 10 is a block diagram of a control unit of the air conditioner of FIG. 10.
Figure 11:
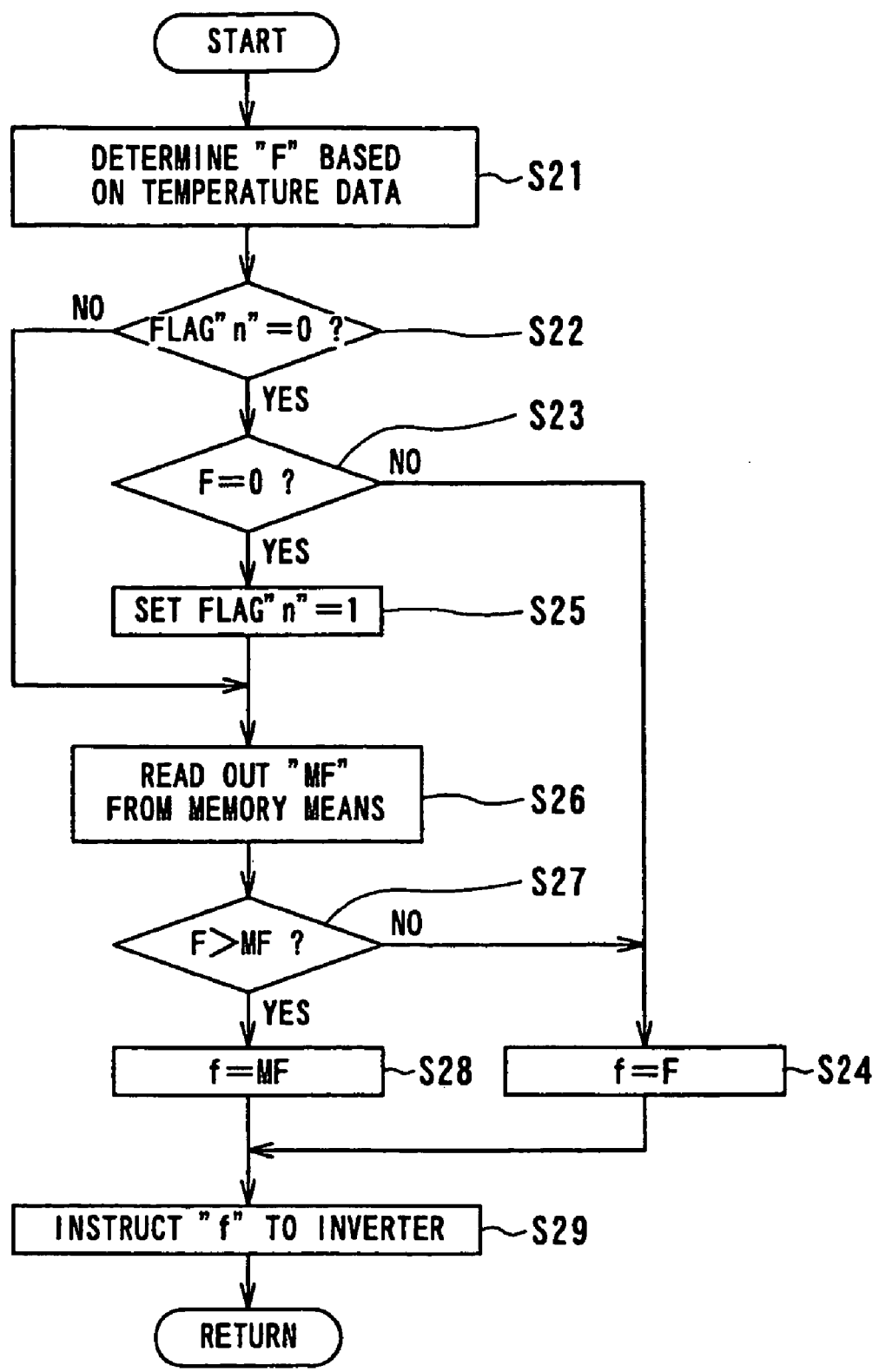
FIG. 11 is a flowchart representing the operation in the control unit for determining an inverter frequency according to the third embodiment.

A third embodiment of the present invention will be further described hereunder with reference to FIGS. 9 to 11.

In this third embodiment, an operation of the air conditioner, in which there causes a case of so-called a "thermo-off" phenomenon, is referred to.

In general, an inverter-type air conditioner (comprising a capacity variable compressor unit including an inverter), as mentioned before, an output frequency of the inverter, i.e., revolution of compressor, is determined in response to the temperature data including temperature difference between the indoor temperature and the set temperature, or temperature variation or change. In a usual operation mode, the capacity of the air conditioner is controlled in response to an air-conditioning load in the room by means of proportional-plus-integral control method (PI method), for example, so that the stable operation of the air conditioner is maintained and continued at a relatively low frequency at which the room (indoor) temperature substantially accords with the set temperature.

However, in a case where the air conditioner is set in a room having a small space or area with respect to the specific capacity of the air conditioner, there may cause a case that, in the operation under the minimum air conditioning capacity of the air conditioner set in the room, the capacity exceeds an air conditioning load in the room. In such case, the room temperature is lowered largely below the set temperature, and finally, there will cause a case of operation stop of the air conditioner (i.e., inverter output frequency becomes zero, so-called "thermo-off" state, as far as the air conditioner is operated).

The present invention was conceived also in consideration of occurrence of such "thermo-off" phenomenon.

That is, according to the capacity variable air conditioner of the present invention, even in an occurrence of such "thermo-off" phenomenon, maximally allowable capacity can be changed, after the occurrence of the "thermo-off", to a lowered value, thus advantageously reducing running cost or consumption energy.

Figure 5:
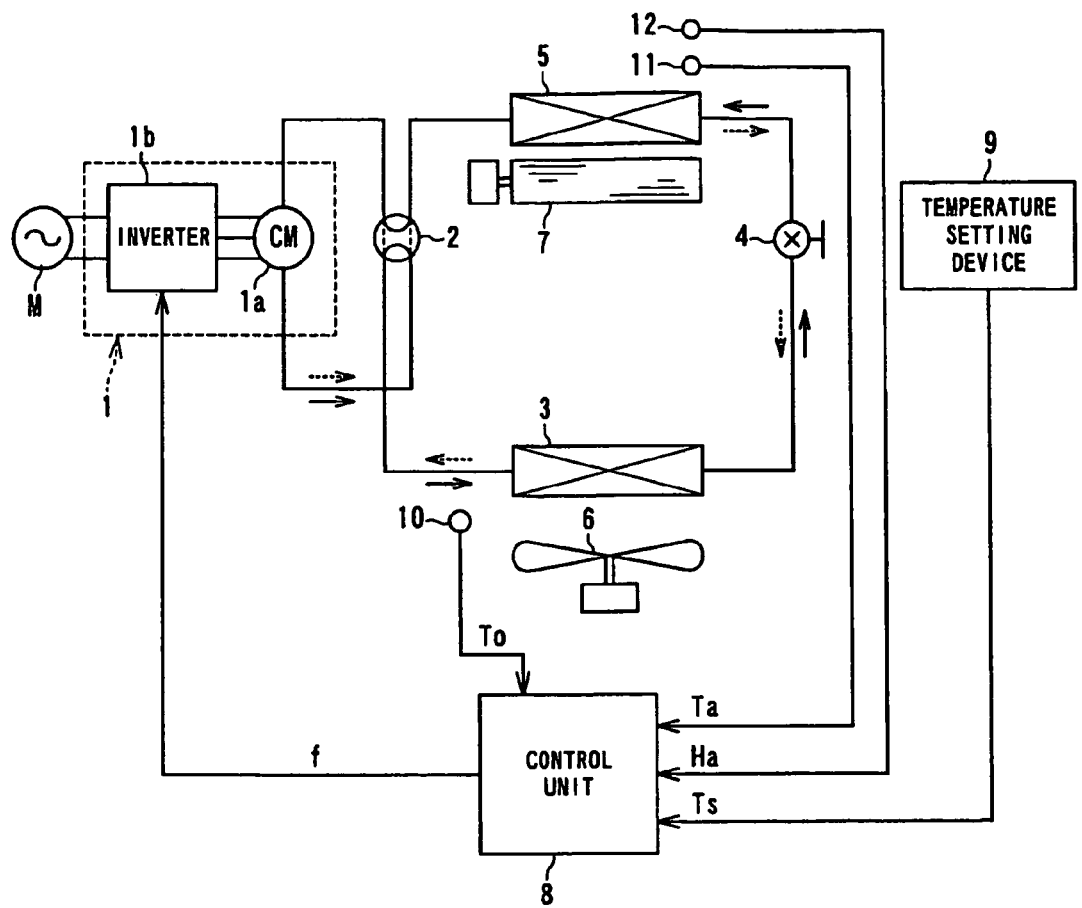
FIG. 5 is a schematic diagram showing an air conditioner according to a second embodiment of the present invention.

In this embodiment, the outdoor temperature sensor 10 in FIG. 1 will be eliminated, as well as indoor humidity sensor in FIG. 5 from objects to be subjected to control, even if these sensors be arranged.

With reference to FIGS. 9 to 11, an indoor temperature Ta is detected by the indoor temperature sensor 11 and inputted into the capacity determining means 13a of the control means 13 of the control unit 8 and the set temperature Ts is also inputted into the capacity determining means 13a from the temperature setting device 9. In the capacity determining means 13a, these temperatures are compared to determine a target frequency F for the inverter (step S21). Further, as mentioned above, in this embodiment, any information from the outdoor temperature sensor and the indoor humidity sensor is not inputted into the memory address means 13b of the control unit 8.

In step S22, it is judged whether some phenomenon such as so-called "thermo-off" phenomenon occurred or not, that is, whether FLAG "n" is zero or not (FLAG "n"=0?). In the case of "Yes", it is judged that no phenomenon has occurred, and the frequency data based on the temperature data for determining the capacity is outputted to the maximum capacity limiting means 13c as target frequency F (Hz). Next, in step S23, it is judged whether some phenomenon, i.e., in this embodiment, the "thermo-off" phenomenon, has occurred or not, that is, F=0?. In this judgment, in the case of "No", that is, in the case of no occurrence of "thermo-off", the target frequency F is judged as the inverter frequency f (step S24), which is then outputted to the inverter 1b of the capacity variable compressor unit 1 (step S29), and the cooling cycle is executed with this frequency f (Hz).

On the contrary, in the step S23, in the case of "Yes", it is judged that the "thermo-off" phenomenon has occurred, and the operation of the capacity variable compressor unit 1 stops, i.e., (Ts 22 Ta; F=0), the FLAG "n" is set to "1" in the capacity determining means 13a (step S25).

Further, the FLAG "n" is an index to judge whether the operation stop phenomenon is caused during the operation of the air conditioner (i.e., capacity variable compressor unit), and the FLAG "n" is set to "1" at the time of "thermo-off" and is set to "O" at the time of the operation stop of the capacity variable compressor and resetting.

In this step S25, when the FLAG "n"=1 is set, this is stored, and this information is sent to the memory address means 13b from the capacity determining means 13a as shown dotted line in FIG. 9. Then, in step S26, the memory address means 13b addresses to the memory means 14 in which the maximally allowable capacity is stored, and reads out the maximally allowable frequency MF, which is then compared with the frequency F in the maximum capacity limiting means 13c (step S27). In this comparison, in the case of F>MF, the maximum capacity is limited and the inverter frequency f is transmitted as f=MF (step S28). On the other hand, in the case of "No", (F<MF), the inverter frequency f is limited as f=F (target frequency), which is thereafter transmitted to the inverter 1b of the capacity variable compressor unit 1, which is then operated at this frequency f (step S29).

At the time of "RETURN", the step returns and the step advances and is continued.

Further, in step S22, in the case of "No" (FLAG "n" is not "0", the step advances to the step S26 (FLAG "n" is "1") and then the step is continued.

As mentioned above, in the air conditioner of this third embodiment, at the operation start period, the FLAG "n" is zero (FLAG "n"=0), and then, some abnormal phenomenon such as "thermo-off" occurs, the FLAG "n" is set to "1" and the operation is continued at this "n"=1. Then, the operation of the air conditioner, i.e., the compressor, stops, the FLAG "n" is made to "n"=0. That is, the air conditioner operates with the FLAG "n"="1" unless the operation stops.

According to this embodiment, in the case where the operation stop phenomenon such as "thermo-off" phenomenon has once been generated, the value of the maximum capacity of the capacity variable compressor unit can be changed to a value lower than the maximally allowable capacity stored in the memory means 14 in the operation after the occurrence of the "thermo-off" phenomenon, thus contributing to consumption energy saving.

As mentioned hereinabove, according to the present invention, the operation of the air conditioner, i.e., capacity variable compressor unit thereof, can be driven at the inverter frequency which is determined by suitably limiting the maximum capacity in consideration of temperature data and so on as occasion demands to a value less than the maximally allowable capacity, which is stored in the memory means (ROM or EEPROM).

It is further to be noted that the present invention is not limited to the described embodiments and many other changes or modifications or combinations may be made without departing from the scopes of the appended claims.

For example, in the embodiments represented by FIGS. 1, 5 and 9, the air conditioners may be commonly provided with all the units, equipments and the like, even if not shown, (and, in general, they are arranged as represented by FIG. 5), except the functions of the control unit 8.

Furthermore, in the illustrated embodiments, a control device is only shown as the control unit 8, but two control units may be arranged respectively for the indoor unit and the outdoor unit, in consideration of functions thereof, which are electrically connected.

What is claimed is:

1. An air conditioner comprising:
    a capacity variable compressor unit;
    an outdoor side heat exchanger;
    a pressure reduction valve;
    an indoor side heat exchanger, said a capacity variable compressor unit, said outdoor side heat exchanger, said pressure reduction valve and said indoor side heat exchanger constituting a cooling medium circulation line;
    a control unit operatively connected to the capacity variable compressor unit;
    a temperature setting device electrically connected to the control unit for setting a predetermined temperature;
    an outdoor temperature sensor electrically connected to the control unit and adapted to detect an outdoor temperature;
    an indoor temperature sensor electrically connected to the control unit and adapted to detect an indoor temperature; and
    a humidity sensor electrically connected to the control unit and adapted to detect a humidity of the indoor side, said control unit including:
        (i) capacity determining means for determining a capacity of the capacity variable compressor unit in accordance with a temperature data from the indoor temperature sensor and the temperature setting device,
        (ii) memory addressing means into which information of outdoor temperature and indoor humidity is inputted,
        (iii) memory means in which a maximally allowable capacity to be read out in relation to the indoor humidity is stored, and
        (iv) maximum capacity limiting means for limiting the capacity of the capacity variable compressor unit determined in accordance with the temperature data to a value less than the maximally allowable capacity read out from the memory means,
    wherein said temperature data includes temperature difference between the detected indoor temperature and the set temperature along with temperature variation.

2. An air conditioner according to claim 1, wherein the maximally allowable capacity is also read out in relation to the outdoor temperature.

3. An air conditioner according to claim 1, wherein said memory means is programmable memory means comprising an electrically erasable programmable read-only memory (EEPROM) in which a value of maximally allowable capacity for the capacity variable compressor unit is made programmable.

4. An air conditioner according to claim 1, wherein said capacity variable compressor unit includes an inverter operatively connected to the control unit and a compressor driven at a revolution number determined in response to an operation condition of the inverter, said capacity determining means of the control unit generates a signal representing a target frequency for the inverter on the basis of the temperature data, and said maximum capacity limiting means generates a signal representing an inverter operation frequency determined in comparison with the target frequency and the maximally allowable frequency read out from the memory means.

* * * * *